United States Patent [19]

Haggard

[11] Patent Number: 5,522,909
[45] Date of Patent: Jun. 4, 1996

[54] AIR FILTER DEVICE

[75] Inventor: Clifford D. Haggard, Tulsa, Okla.

[73] Assignee: Purolator Products NA, Inc., Tulsa, Okla.

[21] Appl. No.: 364,617

[22] Filed: Dec. 27, 1994

[51] Int. Cl.[6] .................................................. B01D 46/00
[52] U.S. Cl. ........................ 55/327; 55/336; 55/498; 55/521
[58] Field of Search ............................ 55/320, 327, 336, 55/498, 385.3, 521, DIG. 28

[56] References Cited

U.S. PATENT DOCUMENTS

| | | | |
|---|---|---|---|
| 2,717,148 | 9/1955 | Hall | 55/521 |
| 2,824,622 | 2/1958 | Buckman | 55/498 |
| 3,640,396 | 2/1972 | Brownell | 55/521 |
| 3,799,354 | 3/1974 | Buckman et al. | 55/498 |
| 4,151,095 | 4/1979 | Wright | 55/521 |
| 4,710,297 | 12/1987 | Suzuki et al. | 55/498 |
| 4,783,207 | 11/1988 | Nagashima et al. | 55/498 |
| 5,106,397 | 4/1992 | Jaroszczyk et al. | 55/270 |
| 5,128,039 | 7/1992 | Gabrielson | 55/521 |
| 5,320,657 | 6/1994 | Adams | 55/521 |

FOREIGN PATENT DOCUMENTS

| | | | |
|---|---|---|---|
| 199498 | 2/1958 | Austria | 55/521 |
| 795282 | 3/1936 | France | 55/521 |
| 1288229 | 2/1962 | France | 55/521 |
| 58-93954 | 6/1983 | Japan | 55/498 |
| 61-93816 | 5/1986 | Japan | 55/498 |
| 64-85110 | 3/1989 | Japan | 55/498 |

*Primary Examiner*—C. Scott Bushey
*Attorney, Agent, or Firm*—Joseph V. Tassone

[57] ABSTRACT

An air filter device. The device includes a flat, closed top and an axially aligned open base larger in diameter than the top. Frusto conical filter media extends between the top and the base, the filter media having an axis aligned with the top and the base. An axially aligned, inverted cone extends from the flat, closed top toward the base.

21 Claims, 5 Drawing Sheets

AIR FILTER DEVICE

BACKGROUND OF THE INVENTION

1. Field of the Invention

The present invention relates to an air filter device to provide filtered air to an internal combustion engine.

2. Prior Art

Air filters and air cleaners are well known to provide a source of filtered air to an internal combustion engine. In one type of filter, a housing is provided having an air inlet at its small end and an air outlet at its large end for directing flow of air into and out of the housing. The air filter device itself has a filter element coaxially arranged to the interior of the housing. The filter device fits within the housing and may have either a cylindrical or frusto conical shape. With the frusto conical shape, the diameter upstream is smaller than the diameter downstream. The base of the filter includes a flat ring which is received within the housing and becomes sealably engaged with the housing.

The filter element includes a series of circumferentially arranged pleats. By directing airflow between the pleats a distance axially before passing though the filter, the efficiency and capacity of the air filter is increased and the pressure drop decreased. By evenly distributing airflow, all of the filter media is used.

It is known that additional filter area will increase the filtering capability and will lower the average air flow face velocity. The radial dimension of the filter at the base ring is, however, limited because of the size of the housing.

Additionally, as the radial dimension or width of the pleat increases, it is less rigid and more prone to vibration.

There is a need, therefore, for an air cleaner and air filter device that will maximize the amount of filter area in a given housing space.

There is also a need for an air cleaner and filter device that maximizes axial air flow and minimizes air flow change in direction.

There is further a need to provide maximum rigidity and structural support to the pleats of the air filter media.

There is an additional need for an air cleaner and air filter device that minimizes turbulence.

SUMMARY OF THE INVENTION

The present invention is directed to an air filter device which would fit within a housing having an air inlet for receiving unfiltered air and an outlet to supply filtered air to an engine. The air filter device includes a flat, closed top substantially perpendicular to the axis of the device. An open base is axially aligned with the flat top and has an interior diameter larger than the diameter of the top.

Extending between the flat top and the open base is frusto conical filter media. The filter media is arranged in the form of a plurality of circumferentially spaced primary or first pleats. In one embodiment, the radial depth or width of each primary or first pleat is greater near the flat top than at the open base.

Each primary pleat has an interior edge and an exterior edge. Each interior edge has a greater angle to the frusto conical axis than the angle to the frusto conical axis of each exterior edge.

A series of inverted, secondary pleats are interspaced between the primary pleats. The secondary pleats are reversed in orientation to the primary pleats. The secondary pleats have their greatest depth at the open base and gradually taper to a zero depth toward the flat top.

DETAILED DESCRIPTION OF THE PREFERRED EMBODIMENTS

Figure 1:
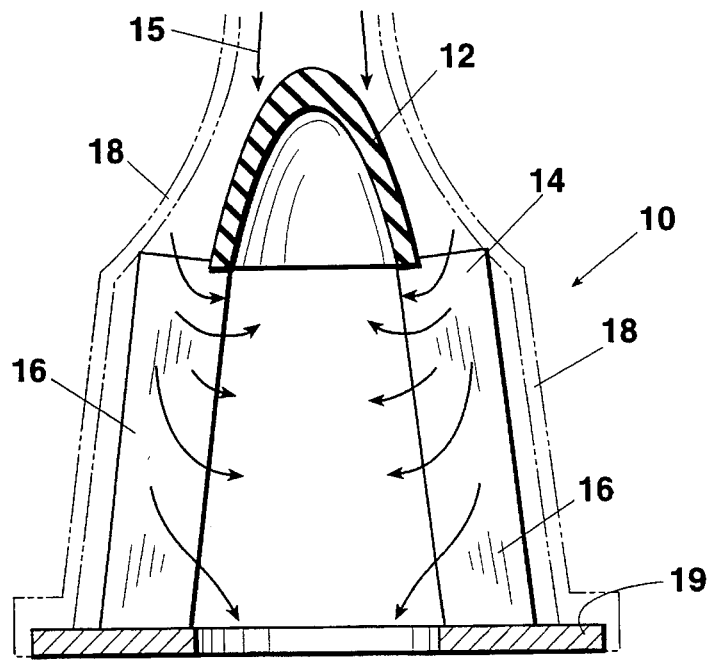
FIG. 1 is a sectional view of a known, prior art air filter device.

Referring to the drawings in detail, FIG. 1 illustrates a sectional view of a known, prior art cleaner and filter device 10, which would fit within a generally cylindrical housing 18 (shown in dashed lines) having an air inlet for receiving unfiltered air and an air outlet to supply filtered air to an engine (not shown).

The prior art air filter device includes a nose cone-shaped member 12 with the base portion of the cone attached to the filter element 14. The filter element 14 is generally frustoconical shaped. The filter element is folded in a series of circumferentially arranged and axially extending pleats 16. A base ring 19 secures the downstream end of each pleat 16. The base ring may be formed around the base end of the filter element 16. The base ring is also sealably engaged with the housing 18. The filter may be manufactured by forming the pleats in the filter material and placing into a mold used to form a ring. The material is then poured into the mold and allowed to cure about the pleats. The airflow through the filter is illustrated by arrows 15.

It will be appreciated that the maximum diameter of the base ring 19 as well as the maximum diameter of the filter element is limited by the diameter of the cylindrical housing.

Figure 2:
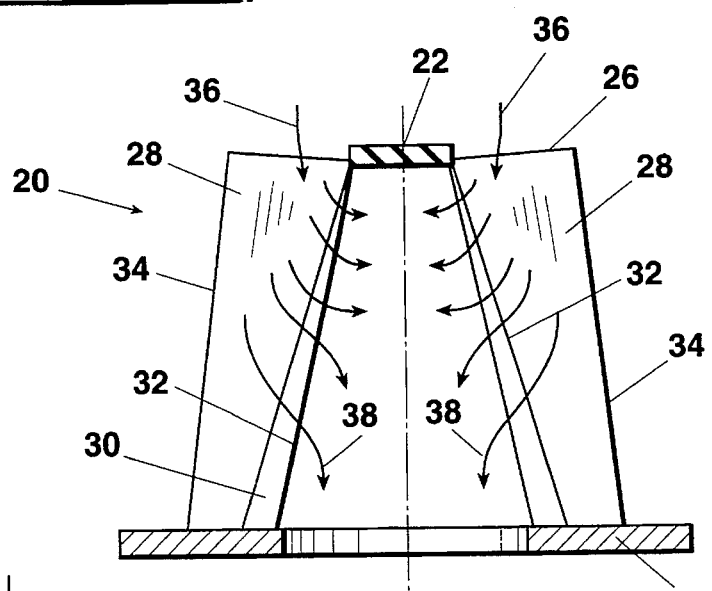
FIG. 2 is a sectional view of one embodiment of an air filter and air cleaner device constructed in accordance with the present invention.

FIG. 2 shows an air cleaner and air filter device 20 constructed in accordance with the present invention. A flat, closed top 22 is substantially perpendicular to the axis of the filter device 10. An open base 24 is axially aligned with the flat top 22 and has an interior diameter larger than the diameter of the top 22. In the present embodiment, the open base 24 is substantially circular. The filtered air exits through the opening in the base 24 to supply filtered air to the engine.

Extending between the flat top and the open base is frusto-conical filter media 26. The filter media 26 is in the form of a plurality of circumferentially arranged primary or first pleats 28. The axis of the filter media 46 is aligned with the axis of the top and the base. It will be observed that the radial depth or width of each primary or first pleat 28 is greater near the flat top 22 than at the open base 24.

A series of inverted secondary pleats 30 are interspaced between the primary pleats 28. The secondary pleats, two of which are visible in FIG. 2, are reversed in orientation to the primary pleats. The primary and secondary pleats are formed from a single sheet of filter media in the embodiment shown. As can be seen in FIG. 2, the secondary pleats 30 have their greatest depth at the open base 24 and taper with a reduced depth toward the flat top 22. The present design takes advantage of the use of a frusto-conical filter element while, at the same time taking maximum advantage of the available space within the cylindrical housing. It has been found that the present design has up to 40% additional filter area than conventional designs.

Each primary pleat 28 has an interior edge 32 closest to the axis and an exterior edge 34 farthest from the axis of the device. It will be observed that each interior edge 32 has a greater angle to the frusto-conical axis than the angle to the frustro-conical axis of each exterior edge 34. This is achieved due to each interior edge having an inverted secondary pleat therein.

In the embodiment shown, the filter media is fabricated from a single piece of media wherein each interior edge is folded to form an inverted secondary pleat.

The direction of the incoming air to the filter device 20 is illustrated by arrows 36 while the direction of air moving through the filter media is illustrated by arrows 38.

The air flow is directed between the primary pleats a distance axially before passing through the filter media. By more evenly distributing the incoming airflow over the filter media, more of the filter media is used.

Without the inverted, secondary pleats 30, the total primary pleat radial depth might be greater than the allowable base depth at the base ring. By use of the secondary, inverted pleats, the total radial pleat depth at the base is sufficient to be placed within the allowable base diameter dimension.

Over the axial length of each secondary pleat 30, the secondary pleat eventually tapers to zero depth at the top. The secondary pleats additionally serve to space apart the primary pleats to encourage axial air flow therethrough.

Figure 3:
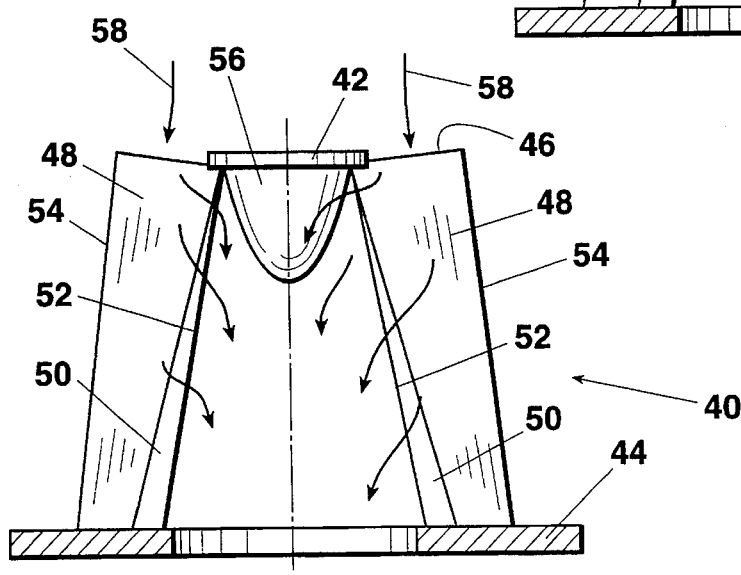
FIG. 3 is an alternate embodiment of an air cleaner and air filter device constructed in accordance with the present invention.

FIG. 3 illustrates a partial sectional view of an alternate embodiment 40 of an air cleaner and air filter device constructed in accordance with the present invention. A flat top closure member 42 is substantially perpendicular to the axis of the filter device. A circular open base 44 is axially aligned with the top closure member 42 and has an interior opening larger than the diameter of the top closure member 42.

Extending between the top closure member 42 and the open base 44 is frusto conical filter media 46. The filter media 46 is composed of a plurality of circumferentially arranged primary or first pleats 48 in the filter media. The axis of the filter media 46 is aligned with the axis of the top and the base. The radial depth of each primary or first pleat is greater near the top closure member 42 than at the open base 44.

A series of inverted secondary pleats 50 are interspaced between the primary pleats. The secondary pleats, two of which are visible in FIG. 3, are reversed in orientation to the primary pleats. The secondary pleats 50 have their greatest depth at the open base 44 and taper with a reduced depth toward the top closure member.

Each primary pleat 48 has an interior edge 52 closest to the axis and an exterior edge 54 farthest from the axis. Each interior edge 52 has a greater angle to the frusto conical axis than the angle to the frusto conical axis of each exterior edge 54.

The embodiment in FIG. 3 includes an axially aligned inverted cone 56 extending from the top closure member toward the open base. The inverted cone 56 extends only a small portion of the axial length of the device 40.

Arrows 58 show the path of air approaching the filter device 40. Arrows 59 show the direction of air moving through the filter media 46. The inverted cone 56 assists in encouraging air flow axially toward the open base 44 and decreasing air turbulence after passing through the filter media.

Figure 4:
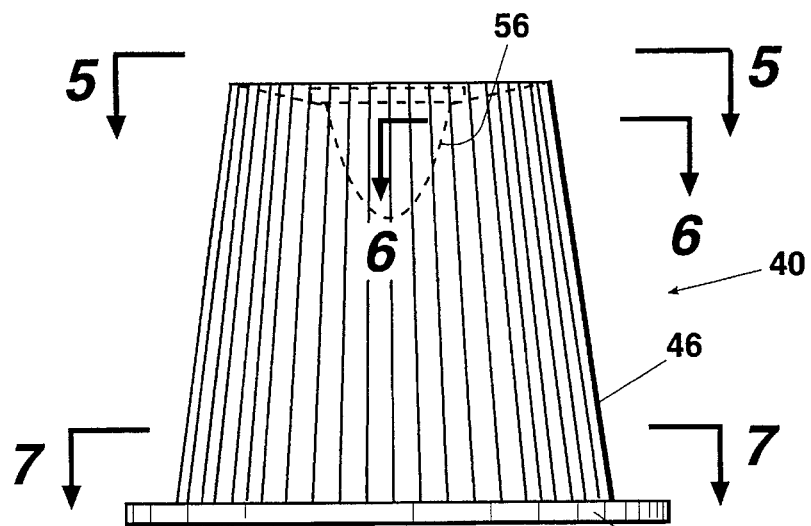
FIG. 4 is an elevational view of the air filter and air cleaner device shown in FIG. 3.
Figure 5:
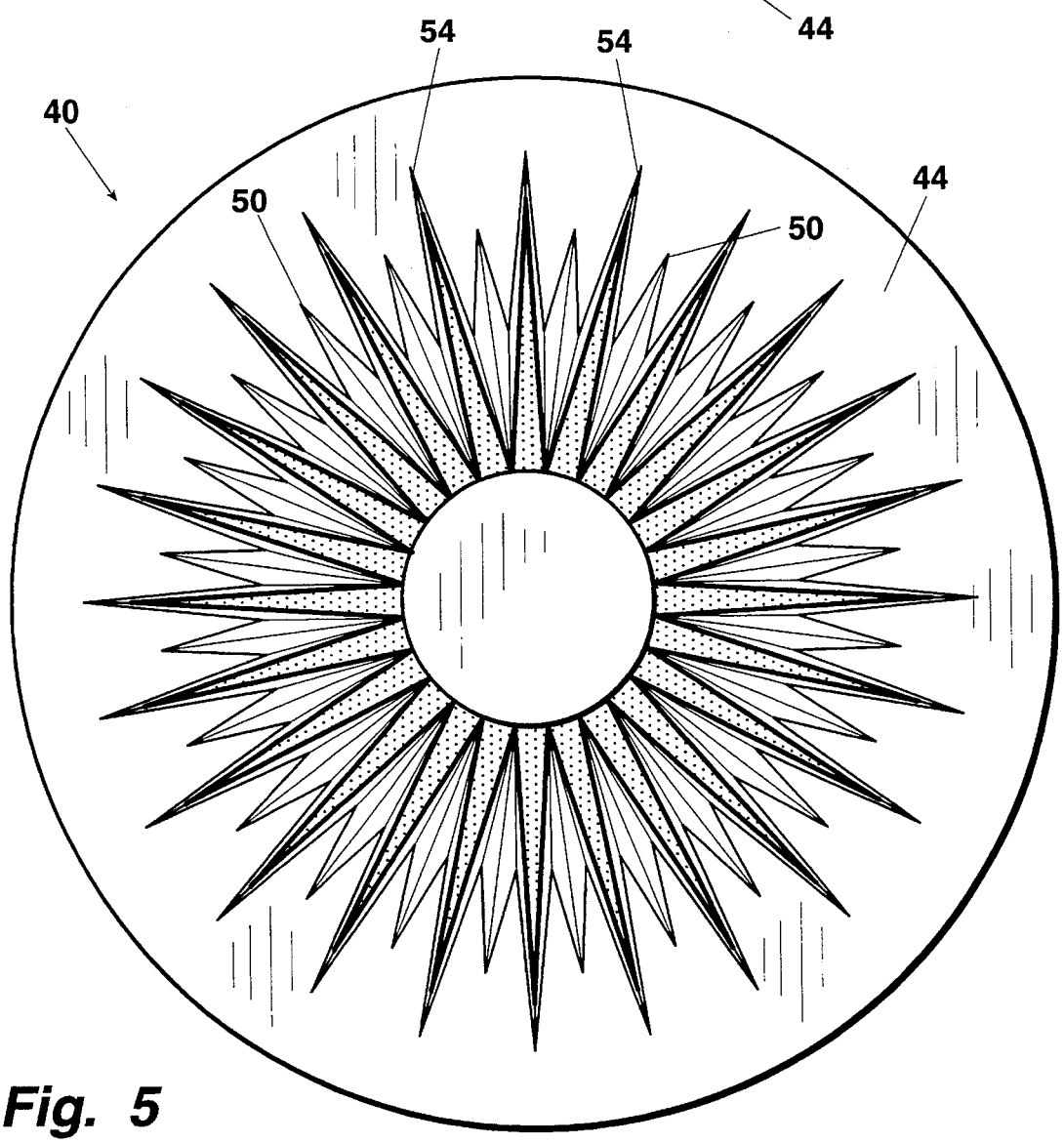
FIG. 5 is a top view of the air cleaner and air filter device taken along section line 5—5 of FIG. 4.

FIGS. 4, 5, 6 and 7 illustrate various views of the filter device 40 shown in FIG. 3. The exterior of circumferentially extending primary pleats 48 are visible in FIG. 4. FIG. 5 illustrates a view of the device 40 taken along section line 5—5 of FIG. 4. The circumferential arrangement of both the primary and secondary pleats may be observed. The inverted secondary pleats 50 are visible interspaced between the primary pleats 48. By interspacing the secondary pleats 50, the space between the primary pleats is increased, resulting in additional filter media being exposed normal to the air flow.

Figure 6:
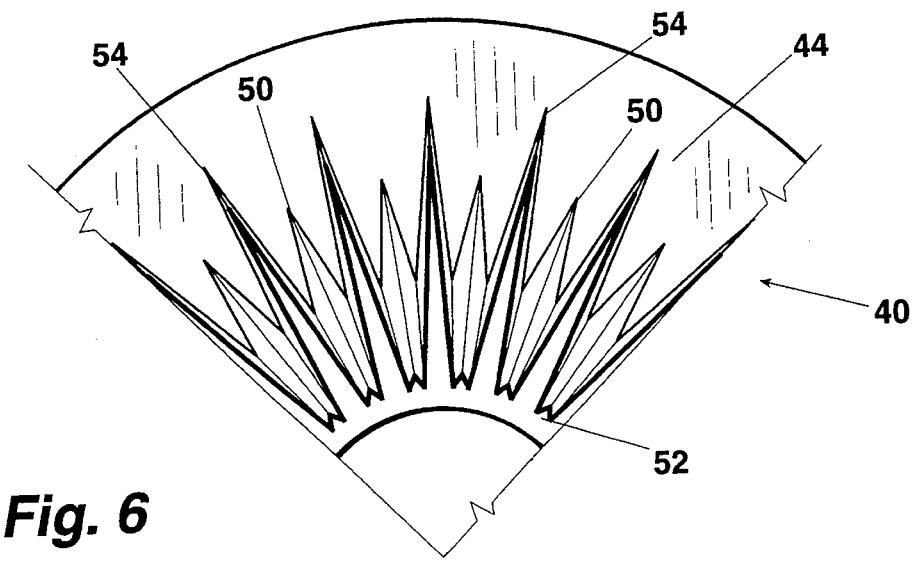
FIG. 6 is a sectional view of the air cleaner and air filter device taken along section line 6—6 of FIG. 4.

The inverted tail cone (shown in dashed lines in FIG. 4) will act as a flow straightener for the small amount of air recirculation after passing through the filter media. FIG. 6 illustrates a sectional view taken along section line 6—6 of FIG. 4. It can be seen that the interior edge primary pleats 54 are reversed in orientation to form the interspaced secondary pleat 50. Each secondary pleat tapers from zero depth near the top closure member to its widest depth at the base 44.

Figure 7:
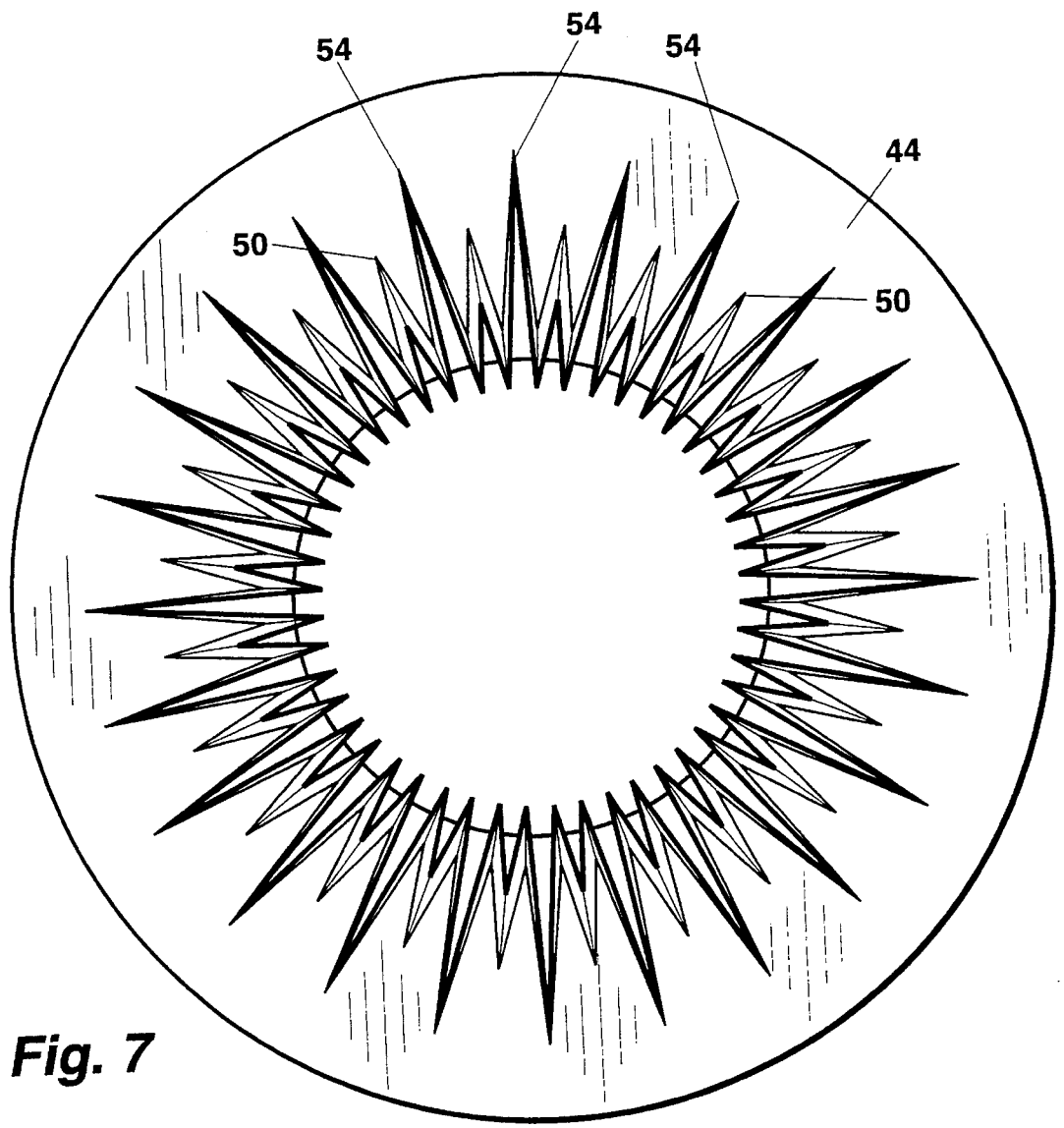
FIG. 7 is a sectional view of the air cleaner and air filter device taken along section line 7—7 of FIG. 4.

FIG. 7 illustrates a sectional view of the device 40 taken along section line 7—7 of FIG. 4. The radial depth of the secondary pleats 50 is increased over the radial depth of the secondary pleats seen in FIG. 6.

Figure 8:
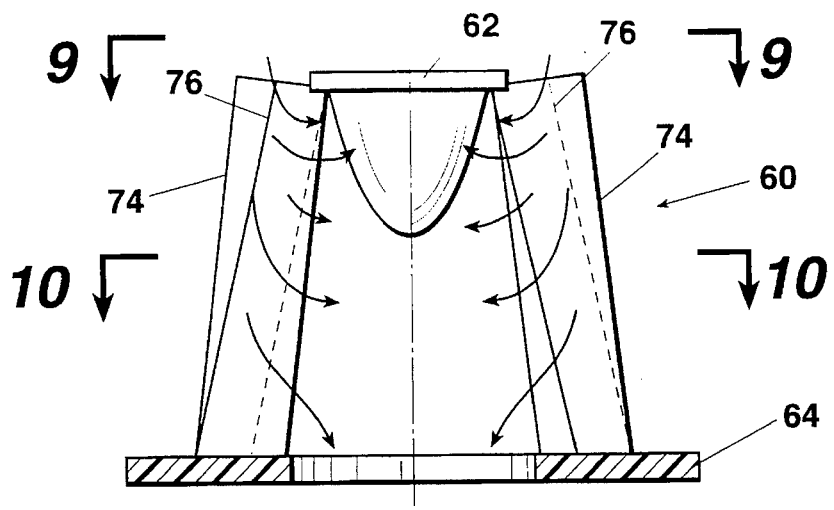
FIG. 8 is a further alternate embodiment of an air cleaner and air filter device constructed in accordance with the present invention.

FIG. 8 illustrates a further alternate embodiment 60 of the air cleaner and air filter device of the present invention. A flat, closed top 62 is substantially perpendicular to the axis of the filter device 60. An open base 64 is axially aligned with the flat top 62 and has an interior diameter greater than the top 62 diameter.

Extending between the top closure member 42 and the open base 64 is frusto-conical filter media composed of a plurality of circumferentially arranged primary or first pleats. The embodiment 60 shown in FIG. 8 is similar to the embodiment 40 in FIGS. 3, 4, 5, 6, and 7 with an additional feature. Each exterior pleat edge 74 has an additional inverted, secondary pleat 76. The exterior edge inverted secondary pleats 76 are thereby interspaced between the primary pleats. The exterior edge secondary pleats 74 are reversed in orientation to the primary pleats.

Figure 9:
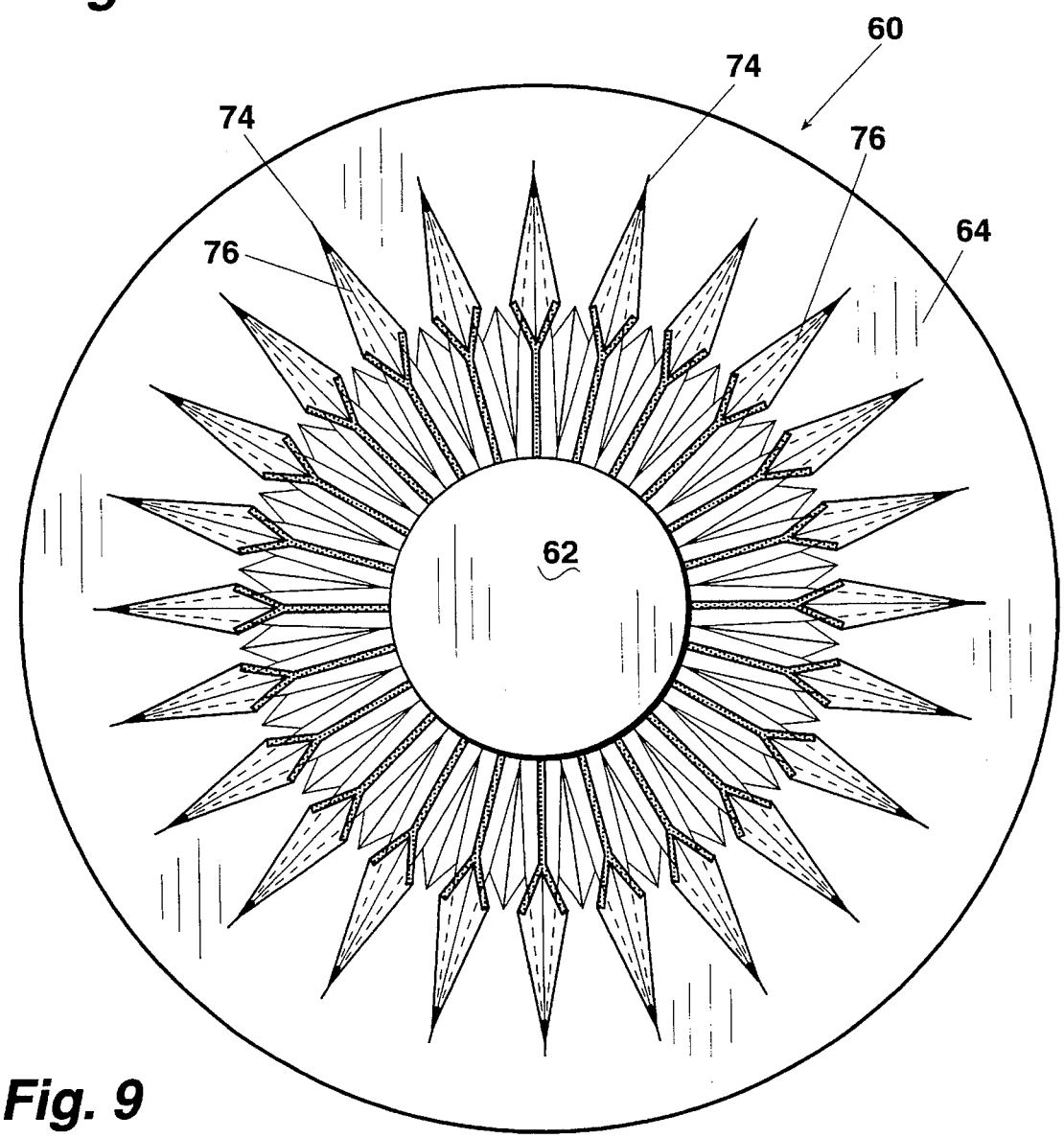
FIG. 9 is a top view of the air filter and air cleaner device taken along section line 9—9 of FIG. 8.

FIG. 9 illustrates a top view of the embodiment 60 taken along section line 9—9 of FIG. 8. The exterior edge 74 of each primary pleat has a further inverted, secondary pleat which is visible as a Y-shape in FIG. 9.

Figure 10:
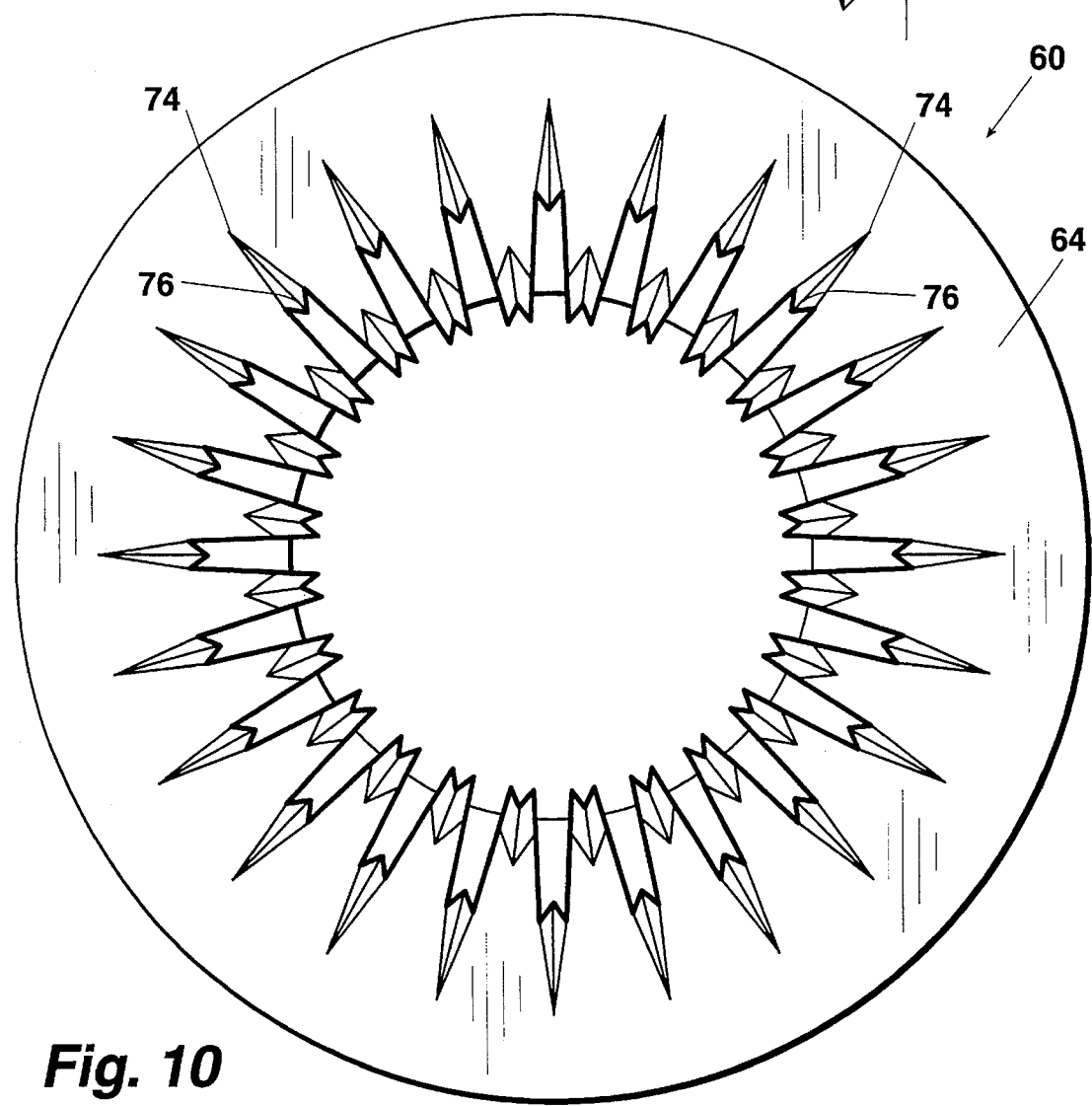
FIG. 10 is a sectional view of the air cleaner and air filter device taken along section line 10—10 of FIG. 8.

FIG. 10 is a sectional view taken along section line 10—10 of FIG. 8. Each exterior pleat edge has its greatest radial depth at the top and gradually tapers to zero depth at the base. The radial depth of the outside edge inverted pleat has been decreased from FIG. 9.

Figure 11:
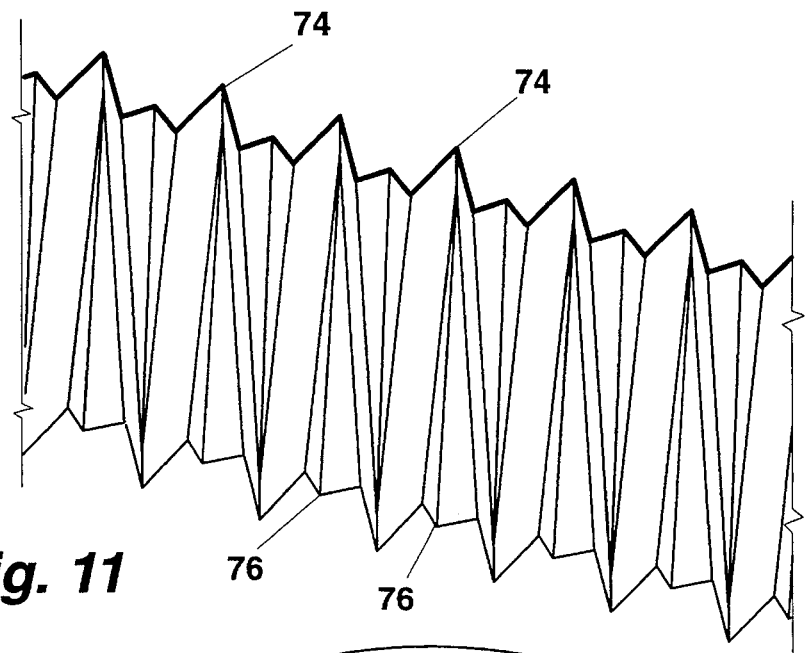
FIG. 11 is a partial, unfolded view of the filter media used in the air cleaner and air filter device shown in FIGS. 8, 9 and 10.

Finally, FIG. 11 illustrates a section of the filter media of the device 60 apart from the device and expanded to show the various folds therein.

Whereas, the present invention has been described in relation to the drawings attached hereto, it should be understood that other and further modifications, apart from those shown or suggested herein, may be made within the spirit and scope of this invention.

What is claimed is:

1. An air filter element for use in a filter housing, which element comprises:

a top closure member;

an axially aligned open base larger in diameter than said top closure member;

frusto-conical filter media extending between said top closure member and said base, said filter media having a conical axis aligned with said top closure member and said base; and an axially aligned inverted closed cone extending within said frusto-conical filter media from said top closure member toward said base.

2. An air filter element as set forth in claim 1 wherein filter media includes a plurality of circumferential primary pleats extending between said top and said base and a plurality of circumferential secondary pleats interspaced between said first pleats having a smaller radial depth than said first pleats.

3. An air filter element as set forth in claim 2 wherein each said secondary pleat has its greatest radial depth at said base and tapers therefrom toward said top closure member, said primary and secondary pleats extending from said base to said top closure member.

4. An air filter device which comprises:

a top closure member;

an axially aligned open base larger in diameter than said top closure member;

frusto conical filter media extending between said top closure member and said base, said filter media having an axis aligned with said top closure member and said base;

a plurality of circumferential pleats in said filter media, each said pleat having an interior edge and an exterior edge, said interior edges having a greater angle to said axis than the angle to said axis of said exterior edges; and an axially aligned inverted closed cone extending from said top closure member towards said base.

5. An air filter device as set forth in claim 4 wherein there are more pleats at said base than at said top.

6. An air filter device as set forth in claim 5 wherein said filter media has twice as many pleats at said base than at said top.

7. An air filter device as set forth in claim 4 wherein said pleats are embedded into said base.

8. An air filter device which comprises:

a top closure member;

an axially aligned open base larger in diameter than said top closure member;

a frusto conical filter having a plurality of circumferential first pleats extending between said top closure member and said base and a plurality of circumferential second pleats interspaced between said first pleats having a smaller radial depth than said first pleats; and an axially aligned inverted cone extending from said top closure member toward said base.

9. An air filter device as set forth in claim 8 wherein each said second pleat has its greatest radial depth at said base and tapers therefrom toward said top.

10. An air filter device as set forth in claim 8 wherein said first pleats and said second pleats are embedded in said base.

11. An air filter device which comprises:

a top closure member;

an axially aligned open base;

a plurality of circumferential primary pleats extending between said top closure member and said base wherein each said primary pleat has an outside edge and an inside edge;

an inverted pleat in each said outside edge;

an inverted pleat in each said inside edge; and an axially aligned closed inverted cone extending from said top closure member towards said base.

12. An air filter device as set forth in claim 11 wherein said primary pleats along with said inverted pleats together form a frusto conical filter media between said top and said open base.

13. An air filter device as set forth in claim 11 wherein each said inside inverted edge pleat has its greatest radial depth at said base.

14. An air filter device as set forth in claim 11 wherein each said outside edge inverted pleat has its greatest radial depth at said top.

15. An air filter device as set forth in claim 11 wherein said primary pleats and said inside edge inverted pleats are embedded into said base.

16. For use in a filter housing a filter member comprising:

an annular filter element made of thin filter material folded in a manner to define a series of circumferentially arranged and axially extending pleats, the element having an upstream end and a downstream end, the pleats defining axially extending interior and exterior channels, the pleats having radial inner and outer edges, the filter element being frusto conical in configuration tapering from a larger diameter annular downstream end to a smaller diameter annular upstream end and having a hollow interior;

means sealing said filter element interior channels at said upstream end;

means sealing said filter element exterior channels at said downstream end;

an inverted closed conical member positioned in and closing said annular upstream end, the conical member extending into said filter element hollow interior in the direction towards said downstream end.

17. An air filter element as set forth in claim 16 wherein filter media includes a plurality of circumferential primary pleats extending between said conical member and said base and a plurality of circumferential secondary pleats interspaced between said first pleats having a smaller radial depth than said first pleats.

18. An air filter element as set forth in claim 17 wherein each said secondary pleat has its greatest radial depth at said base and tapers therefrom toward said conical member, said primary and secondary pleats extending from said base to said conical member.

19. An air filter device as set forth in claim 17 wherein there are more pleats at said base than at said conical member.

20. An air filter device as set forth in claim 19 wherein said filter media has twice as many pleats at said base than at said conical member.

21. A filter member according to claim 16 wherein said conical member includes a radially extending flange portion engaging said pleats radial inner edges.

* * * * *